Dec. 8, 1959   D. W. CARLE ET AL   2,916,057
FLUID SAMPLING DEVICE
Filed Aug. 26, 1957
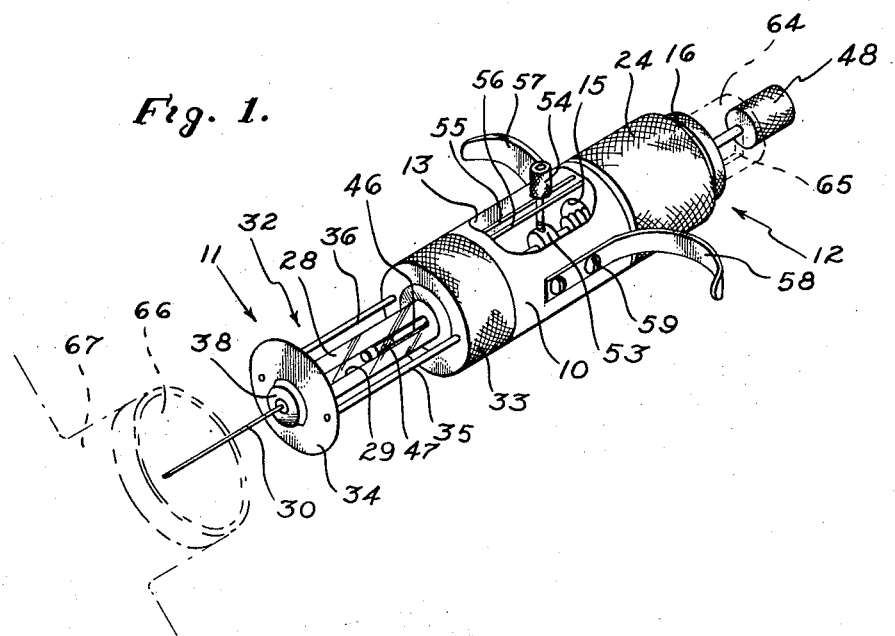
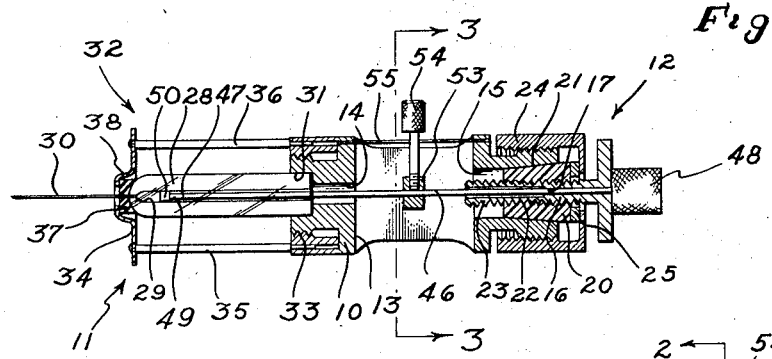
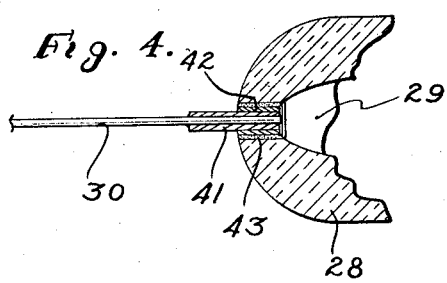
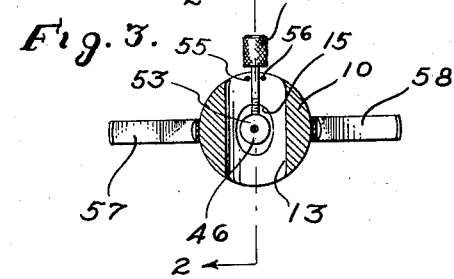
INVENTORS
DON W. CARLE
WILLIAM VAN WORMER
BY THEIR ATTORNEYS
HARRIS, KIECH, FOSTER & HARRIS

United States Patent Office 2,916,057
Patented Dec. 8, 1959

2,916,057

FLUID SAMPLING DEVICE

Don W. Carle, Whittier, and William Van Wormer, Fullerton, Calif., assignors to Beckman Instruments, Inc., Fullerton, Calif., a corporation of California Application August 26, 1957, Serial No. 680,261

3 Claims. (Cl. 141—27)

This invention relates to fluid sampling devices for dispensing small volumes of fluids and, in particular, to such devices which are especially suited for injecting small amounts of liquid samples into gas chromatographs and the like. It is an object of the invention to provide a fluid sampling device for dispensing very small quantities of fluid rapidly and in exact and repeatable quantities. Another object of the invention is to provide such a device suitable for dispensing samples in the range of a hundredth milliliter or less to several hundredths, although useful for much larger volumes (e.g. 1–25 cc.) where precise samples are required.

Samples, usually liquid but occasionally gas, are introduced into gas chromatographs by injecting the sample through a rubber diaphragm or the like positioned in the input line to the partitioning or adsorption column of the chromatographic apparatus. Various devices have been used for injecting the sample but variations in the rate of ejection of the sample from the device, the viscosity of the sample, leakage in the device, temperature, volumetric error, vaporization loss and other variables have affected adversely the accuracy and reproducibility of the measurements. In order to obtain reproducible results in chromatographs, it is necessary that all of the sample be introduced substantially instantaneously and that the quantity of sample be accurately reproducible. Even the vaporization of sample from the tip of a conventional hypodermic syringe during the period between filling of the syringe and ejection of the sample will affect the reproducibility. It is a further object of the invention to provide a fluid sampling device for use with a gas chromatograph which will provide a reproducibility of results of 0.1%.

It is another object of the invention to provide a positive displacement fluid-dispensing device that is free of back-leakage, can be preset to deliver a desired volume precisely and reproducibly with a single, rapid stroke, and is adapted to vent or eliminate the void at the delivery tip immediately before ejection of a sample, without affecting accuracy of the preset volume to be delivered.

It is a further object of the invention to provide a fluid sample injection device having a body carrying a pair of stops and a plunger carrying a second pair of stops with the plunger slideable relative to the body for drawing in and ejecting the fluid sample and with one pair of the stops positioned between the stops of the other pair for limiting the stroke of the plunger. Another object of the invention is to provide such a device in which at least one of the stops is adjustable for varying the length of stroke. A further object of the invention is to provide such a device in which one of the pairs of stops is movable as a unit relative to the member on which the pair is carried, permitting repeated ejection of the predetermined quantity of fluid without refilling of the fluid container.

It is another object of the invention to provide a syringe-type fluid sampling device in which the fluid containing tube and needle are fixed together and are removably clamped to the body and plunger assembly, permitting rapid disassembly and cleaning of the instrument.

The invention also comprises novel details of construction and novel combinations and arrangements of parts, which will more fully appear in the course of the following description. The drawing merely shows and the description merely describes a preferred embodiment of the present invention which is given by way of illustration or example.

In the drawing:

Fig. 1 is an isometric view of a preferred embodiment of the invention with the injection cap of a gas chromatograph shown in phantom;

Fig. 2 is a longitudinal sectional view of the embodiment of Fig. 1 taken along the line 2—2 of Fig. 3;

Fig. 3 is a sectional view taken along the line 3—3 of Fig. 2; and

Fig. 4 is an enlarged sectional view showing the junction of the needle and fluid container.

Generally, the structure of the invention comprises a shell assembly consisting of the stationary elements and a plunger assembly consisting of the moving elements. The shell assembly includes a body 10 with a fluid container assembly 11 mounted at one end of the body and a plunger control assembly 12 mounted at the other end. A large transverse opening 13 is provided in the central portion of the body 10, and aligned axial openings 14, 15 provide communication between the transverse opening and each end respectively of the body.

A plunger guide 16 having an axial opening 17 therethrough is positioned in the opening 15 of the body and means are provided for varying the relative axial positions of the plunger guide and body. A preferred form of construction includes an insert 20 of tough, flexible material such as nylon or the like, positioned in a tapered portion 21 of the opening 15 and having an axial opening 22 therethrough for receiving a threaded portion 23 of the plunger guide 16. A lock screw 24 is threadedly mounted on the body 10 with the lock screw engaging the insert 20 via a washer 25 so that when the lock screw is advanced along the threaded section of the body, the insert will be forced into the tapered section 21, compressing the insert around the plunger guide. The rotation of the lock screw in the opposite direction will loosen the grip of the insert on the plunger guide and permit rotation of the plunger guide for advancement relative to the body. It is preferred to longitudinally slit the insert to improve the clamping and release action of the insert.

The fluid container assembly 11 includes a tube 28, preferably of glass or similar material, with a cylindrical opening 29 therethrough and a hollow needle 30 fixed to one end thereof forming a tube and needle assembly having a radial shoulder at the junction of the tube and needle. The end of the tube 28 opposite the needle is fitted in a counterbore 31 of the opening 14 and is held in place by a removable clamp assembly 32. The clamp assembly includes a nut 33 which is threadedly mounted on the body 10 and a clamp ring or plate 34 supported on parallel rods 35, 36, one end of each rod being peened over to hold the plate 34 and the other end of each rod being fixed in the nut 33. An apertured rubber bumper 37 is positioned in a recessed portion 38 of the plate 34 for engaging the end of the tube 28 at the radial shoulder when the clamp assembly and the tube and needle are mounted on the body.

Ordinarily, the needle 30 is made of stainless steel and the tube 28 of a Pyrex glass. The enlarged view of Fig. 4 shows a preferred manner of joining the needle and tube. A short piece of platinum tubing 41 is copperplated along a portion of the outer surface of the tubing, the copperplate being indicated by the reference numeral 42. The copper oxidizes during sealing into the Pyrex glass to produce a copper oxide coating, indicated by the reference numeral 43, which forms an effective bond with the glass. Then the stainless steel needle 30 is inserted into the other end of the platinum tubing 41 and sealed in place by soldering.

The plunger assembly includes a plunger rod 46 with a piston 47 fixed to one end and a finger knob 48 fixed to the other end, the rod being slideably positioned within the openings 29, 14 and 17. The piston 47 is preferably made of a tough, nonwettable material such as Teflon or the like and includes a portion 49 for engagement with the plunger rod and a portion 50 for engagement with the inner wall of the tube 28 to provide a positive, low-friction seal without any trace of back-leakage.

A collar 53 is slidingly positioned on the plunger rod 46 within the opening 13 of the body and a lock screw 54 is threadedly positioned in the collar for engagement with the plunger rod to fix the collar in position on the rod. Parallel guide rods 55, 56 are mounted in the body 10 across the opening 13 with a portion of the lock screw 54 disposed between the rods to prevent rotation of the lock screw around the plunger axis. Outwardly curving finger grips 57, 58 are fixed to opposite sides of the body 10 by suitable means, such as screws 59.

In general, the fluid sampler of the invention is operated in the same manner as the conventional hypodermic syringe. With the plunger moved toward the needle, the needle is inserted into the sample fluid and the plunger is retracted or moved away from the needle to draw fluid into the tube. The unit is then held with the needle upward and the plunger is advanced to eject any air bubble within the tube, following which the needle is again inserted into the fluid for further filling of the tube. The engagement of the knob 48 with the plunger guide 16 limits the travel of the plunger in the ejection direction and engagement of the collar 53 with the plunger guide limits plunger movement in the retraction direction, i.e., the ends of the plunger guide function as a pair of stops carried on the body and the knob and collar function as another pair of stops carried on the plunger. The length of stroke and, therefore the volume of sample ejected is controlled by varying the position of any one of the stops, and in the embodiment illustrated herein, the collar 53 is made slideable along the plunger rod 46. Knowing the diameter of the opening 29 in the glass tube 28, the length of stroke for a particular volume of the sample can be determined in advance. Spacers for setting the stroke length are provided, the length of each spacer corresponding to the length of stroke required to eject a predetermined volume of sample, i.e., a spacer for 0.005 cc., 0.01 cc., 0.02 cc., etc.

A spacer 64 is shown in phantom in Fig. 1, the spacer preferably having a slot 65 therein for positioning over the plunger rod. The plunger is retracted, the spacer is positioned over the rod between the knob 48 and the plunger guide 16, and the plunger is moved in the ejection direction bringing the knob, spacer and guide into engagement. Then the lock screw 54 is loosened and the collar 53 is moved along the rod into engagement with the plunger guide, following which the lock screw is tightened. Then the spacer is removed and the unit is set for delivering a predetermined volume of sample. After the tube has been filled as described previously the needle is inserted through the rubber septum 66 of the sample inlet 67 of a gas chromatograph as shown in phantom in Fig. 1, and the plunger is rapidly moved from the retraction position with the collar engaging the plunger guide to the ejection position with the knob engaging the plunger guide. Since the operator is not concerned with measuring the amount of sample during the injection operation, the total volume of sample may be ejected from the sampler into the apparatus substantially instantaneously. Additional samples of the same volume may be thus injected into the apparatus by repeating the filling and ejecting steps without requiring measurement of the volume or readjustment of the stops.

There is quite often vaporization of sample from the tip of the needle during the period between filling the tube and ejection of the metered quantity of sample therefrom and such vaporization may have a substantial and adverse affect upon the accuracy and reproducibility of the measurements being conducted. A feature of the fluid sampler of the invention permits elimination of this variable. After the length of stroke has been set and the tube has been filled, the plunger is in the retracted position with the collar engaging the plunger guide. Just before the sample is to be ejected, the plunger guide 16 is rotated to advance itself and the plunger rod toward the needle end of the unit, a sufficient distance to cause a minute amount of sample to well out of the tip of the needle, thus eliminating any void or air space formed at the tip due to evaporation. The needle tip is then inserted in the desired location and the plunger rapidly moved to the ejection position. The movement of the plunger guide 16 relative to the body 10 does not disturb the magnitude of sample ejected and yet permits rapid replacement of any sample lost by vaporization. The lock nut 24 is ordinarily positioned on the body 10 so as to provide sufficient clamping force on the plunger guide for preventing movement of the guide due to vibration and handling but permitting manual rotation of the guide.

As an alternative to ejecting the bubble trapped at the piston during the filling operation by directing the needle upward, advancing the plunger, and then refilling the tube, the bubble may be ejected by advancing the plunger guide and hence the plunger until sample fluid appears at the needle tip, after which the metered amount of sample may be ejected in the usual manner.

The fluid sampler of the invention may also be used to eject a plurality of samples, each of the same volume, without refilling the unit. For such operation, the plunger guide 16 is ordinarily moved to its extreme withdrawn position. The instrument is filled and the first sample ejected as described above. Then the plunger guide is advanced toward the needle end of the instrument until the plunger guide engages the collar 53. Then the instrument is ready for ejecting a second sample identical in volume to the previously ejected sample. This process may be repeated until the tube is empty or the limits of travel of the elements has been reached.

If desired, the knob 48 could be longitudinally movable along the plunger rod 46 and the collar 53 could be fixed to the rod or both collar and knob could be movable for setting the length of stroke. Similarly, the length of the plunger guide could be made a variable by utilizing telescoping tubing construction or the like. Of course, the collar and knob could be made engageable with stops fixed to the body 10 with the positions of the collar and knob relative to the piston being adjustable.

The fluid sampler of the invention is easily disassembled for cleaning after use. The nut 33 is unthreaded from the body 10, permitting the clamp assembly 32 to be removed. Then the needle and tube assembly may be lifted out of the counterbore 31 and the plunger withdrawn from the body and collar after loosening of the lock screw 54. These units may be thoroughly cleaned and rapidly reassembled for immediate re-use of the instrument.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

We claim as our invention:

1. In a fluid sample injection device, the combination of: a body having an axial opening therethrough;

an elongated tube and needle assembly having an axial opening therethrough and a radial shoulder between the ends thereof, said assembly being engageable with said body with the axial openings in alignment; a clamp ring for engaging said shoulder; means for mounting said clamp ring on said body, bringing said assembly into engagement with said body; a plunger guide having an axial opening therethrough; means for mounting said plunger guide in said body with the openings thereof coaxial for movement of said guide relative to said body; a plunger slidingly positioned in said opening in said guide, one end of said plunger being sealingly positioned in said assembly and slideable therein for varying the volume of the opening in said assembly, said plunger having a cap at the other end thereof for engaging one end of said guide; a stop slidingly positioned on the plunger between said assembly and said guide for engaging the other end of said guide; and means for clamping said stop to said plunger.

2. In a fluid sample injection device, the combination of: a body unit having an axial opening therethrough, and including a first pair of stops; an elongated tube and needle assembly having an axial opening therethrough and a radial shoulder between the ends thereof, said assembly being engageable with said body unit with the axial openings in alignment; a clamp ring for engaging said shoulder; means for mounting said clamp ring on said body unit, bringing said assembly into engagement with said body unit; and a plunger unit sealingly positioned in said assembly and slidable therein for varying the volume of the opening in said asembly, said plunger unit including a second pair of stops spaced axially along said plunger unit, one stop of said second pair being movable relative to the other stop of the pair, with said first pair of stops positioned between the stops of said second pair and movable conjointly relative to said body unit.

3. In a fluid sample injection device, the combination of: a body having an axial opening therethrough; an elongated tube and needle assembly having an axial opening therethrough and a radial shoulder between the ends thereof, said assembly being engageable with said body with the axial openings in alignment; a clamp ring for engaging said shoulder; means for mounting said clamp ring on said body, bringing said assembly into engagement with said body; a plunger guide having an axial opening therethrough and threadedly mounted in said body with said openings coaxial for movement along said axis by rotation of said plunger guide relative to said body; a plunger slidingly positioned in said opening in said guide, one end of said plunger being sealingly positioned in said assembly and slidable therein for varying the volume of the opening in said assembly, said plunger having a first stop at the other end thereof for engaging one end of said guide; a second stop slidingly positioned on the plunger between said assembly and said guide for engaging the other end of said guide; and means for clamping said second stop to said plunger.

References Cited in the file of this patent

UNITED STATES PATENTS

| 993,436 | Burkle et al. | May 30, 1911 |
| 2,530,909 | Riggs | Nov. 21, 1950 |
| 2,627,857 | Marcelli | Feb. 10, 1953 |
| 2,660,342 | Ruf | Nov. 24, 1953 |
| 2,792,157 | Gilman | May 14, 1957 |
| 2,798,647 | Broadwin | July 9, 1957 |

FOREIGN PATENTS

| 44,329 | France | Oct. 1, 1934 |